Figure 1:
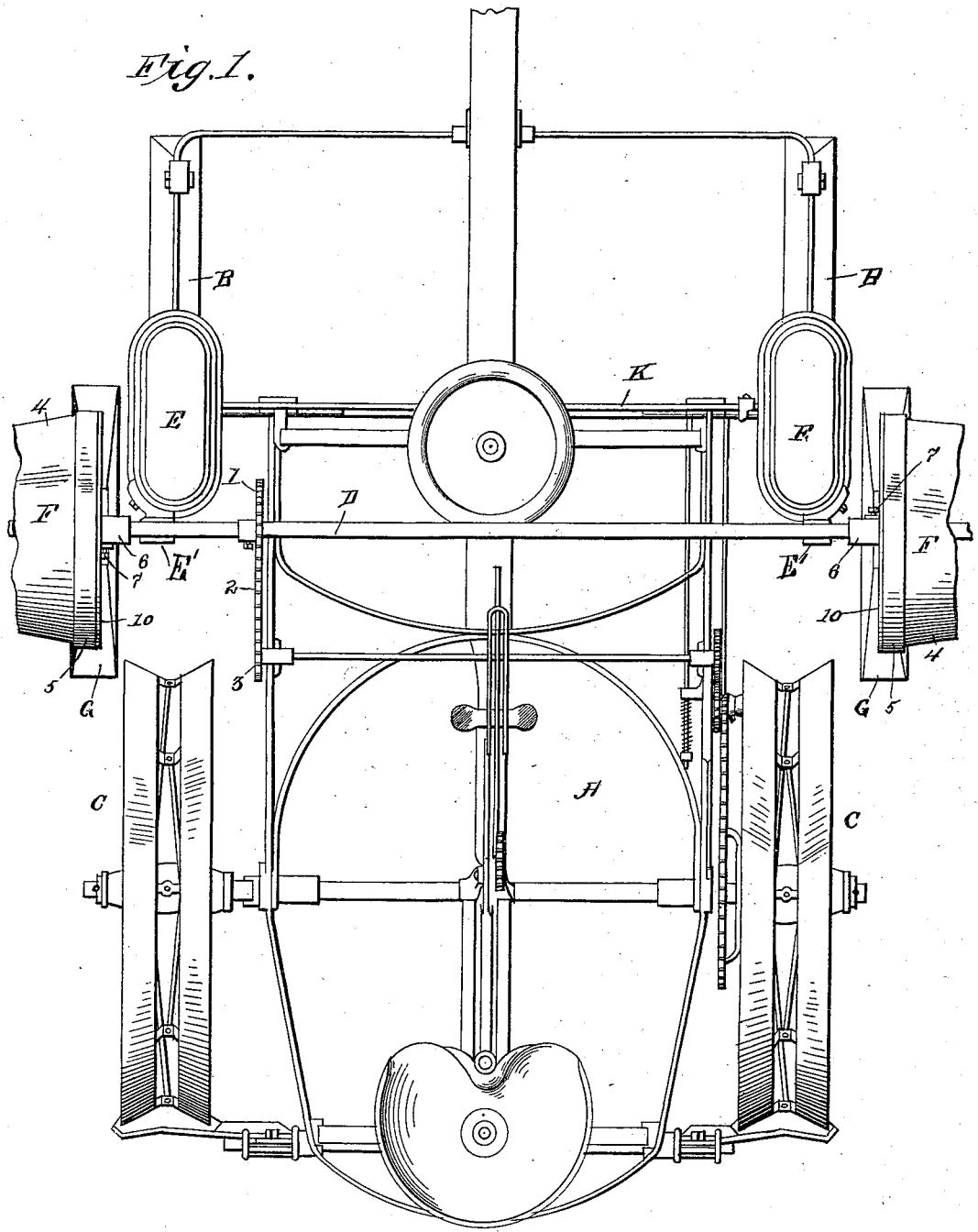

(No Model.)  2 Sheets—Sheet 1.

G. W. PACKER.
FERTILIZER ATTACHMENT FOR SEEDERS.

No. 549,208. Patented Nov. 5, 1895.

Witnesses.
Howard W. Orr
Herbert C. Lewis

Inventor.
George W. Packer.
By John G. Manahan.
Atty.

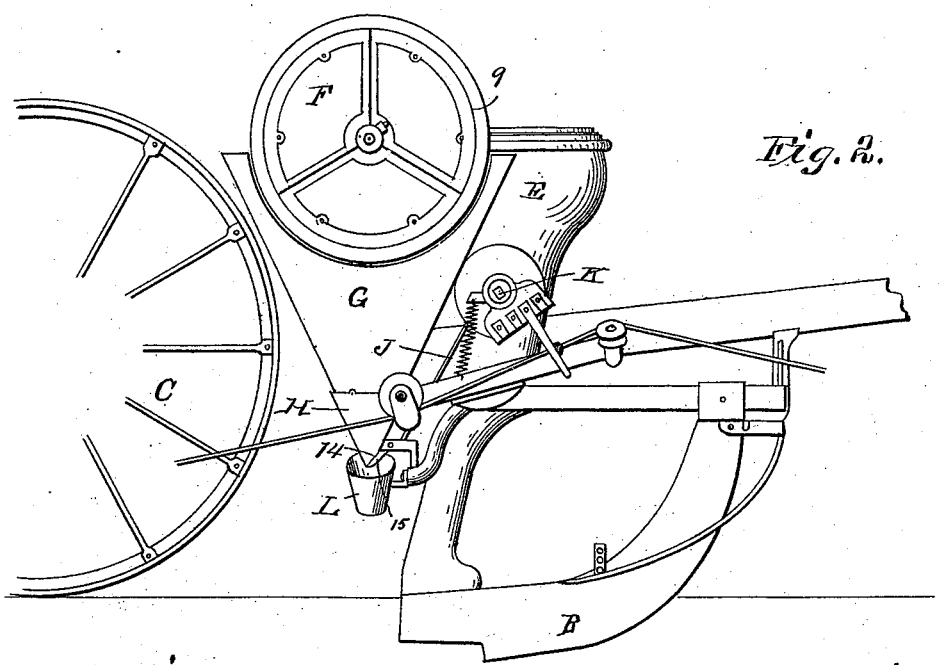
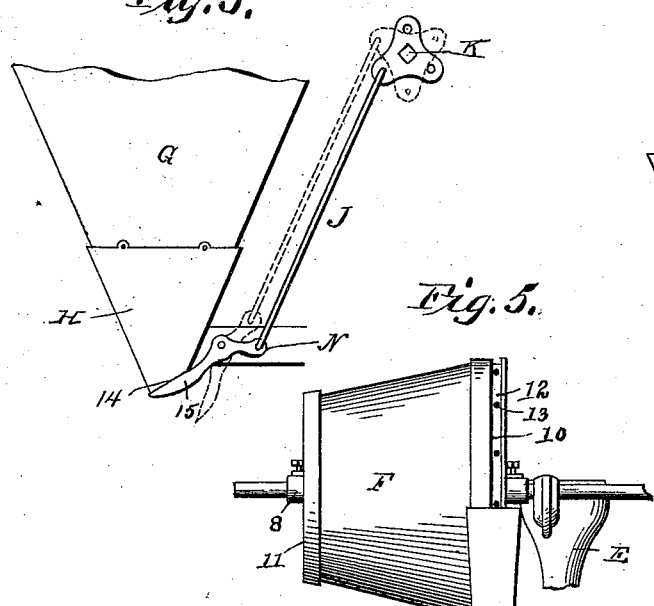
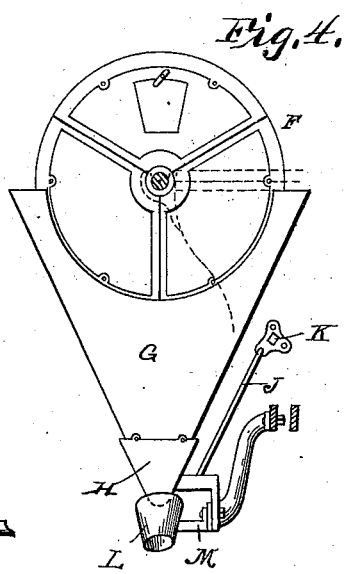

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

FERTILIZER ATTACHMENT FOR SEEDERS.

SPECIFICATION forming part of Letters Patent No. 549,208, dated November 5, 1895.

Application filed July 19, 1895. Serial No. 556,500. (No model.)

*To all whom it may concern:*

Be it known that I, GEORGE W. PACKER, a citizen of the United States, residing at Rock Falls, in the county of Whiteside and State of Illinois, have invented certain new and useful Improvements in Fertilizer Attachments for Seeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in fertilizer attachments; and it consists in a peculiar form of fertilizer-hoppers, means of adjusting the delivery of said hoppers, and the construction, location, and adjustability of the fertilizer boot or duct, together with mechanism for operating and adjusting said devices.

As my invention is adapted for application to any of the usual forms of two-row corn-planters, the essential and customary part of which, together with their operation, are well known, I do not deem it necessary to show or describe the planter proper further than needful to explain the relation thereto of the fertilizer devices and the mode of operating and adjusting the same.

As it is considered injurious to the seed to deposit the fertilizing material directly in the hill therewith, my object is to drop such material either at one side of the hill of corn or above the latter, with earth interposed between such fertilizing material and the seed.

I attain the purposes aforesaid by the construction shown in the accompanying drawings, in which—

Figure 1 is a plan view of my invention as seated upon an ordinary two-row planter. Fig. 2 is a partial side elevation of the same. Fig. 3 is a detail of the manner of dropping the fertilizing material from the bottom of the upper fertilizer-spout. Fig. 4 is a detail showing the means of adjusting the secondary spout at the lower end of the upper fertilizer-spout, so as to change the direction of the final discharge. Fig. 5 is a partial view of the same from the rear of the fertilizer-hopper.

Similar letters refer to similar parts throughout the several views.

A is the general frame of the machine, which may be of any of the usual forms of construction, and consists of two runners or furrow-openers B B, surmounted, respectively, with the usual seed-boxes E and followed by the covering-wheels C.

D is a rotating shaft placed transversely across the machine in brackets E', secured to the rear of the seed-boxes E, and provided with a sprocket-wheel 1, and driven by sprocket-chain 2, which in turn is actuated by the sprocket-wheel 3, seated on the frame of the machine and driven in any suitable mode from one of the wheels C. On the shaft D are placed the fertilizer-hoppers F. The latter are of truncated-cone formation, having flaring sides 4, except within a few inches of their larger and inner ends, where they are provided with parallel or straight sides 5. The hoppers F are placed transversely and horizontally of the machine, with their larger ends inward, and in position to deposit their contents at or near the successive hills of corn.

The shaft D passes through the axis of the fertilizer-hoppers F, and therefore the bottom side of the said hoppers slopes inward or toward the end 5. Inner collars 6 on the shaft D, adjustable by the usual set-screw 7, and like collars 8, seated on the said shaft at the outer ends of said hoppers serve to hold the latter in position on said shaft D and to cause the hoppers F to rotate with said shaft. The latter function is accomplished by means of annular frame 9, set into the head 10 of the hopper F, and a like frame 11, set into the base or either ends of said fertilizer, with which the said collars 6 and 8 are either formed integral or suitably connected.

The annular head 10 passes a short distance within the inner end of the hopper F, being provided with an annular flange 12, which projects within the straight portion 5 of the wall of said hopper and is provided with an annular series of openings 13 for the discharge of the fertilizer contained in said hopper. The head 10 is held in any desired position by adjusting either of the collars 6 or 8 on the shaft D, and thereby the openings 13 in the flange 12 of said head may be used of such size as may be desired. The fertilizing material is discharged successively in small quantities, through the openings 13 in the flange 12, down into a boot G, from whence it falls into a spout H, communicating with said boot G. The lower end of the spout H has an opening 14, normally closed by a positively-operative valve 15, suitably pivoted on the frame of the machine. A pitman J, Fig. 3, connected at its upper end with the check-rower shaft K of the planter and at its lower end with the shank N of valve 15, holds said valve closed when the check-row shaft K is at rest by the action of the usual spring on said shaft. When the check-rower is actuated to deposit the seed from the seed-boxes E, the same movement, through the medium of pitman J, opens the valve 15 and permits the fertilizing material accumulated in the spout H to drop on or near the hill of corn. A secondary spout L is placed below and communicates with the spout H, and is adjustably connected to the frame of the machine by an arm M, attached at one end to said spout and suitably bolted at its other end to said frame. By turning the arm M in different positions in its bolted seat the secondary spout L can be deflected to divert the fertilizing material to the side of the hill, if that is preferred, or upon the side of the furrow-gash, so as to roll into the hill after the seed has been partially covered with earth.

What I claim as my invention, and desire to secure by Letters Patent of the United States, is—

1. The combination of a seed planter, a transverse shaft D seated thereon and driven therefrom, fertilizer hoppers of truncated-cone form, seated axially on said shaft, head 10 provided with flange 12 having openings 13 therein and adapted to be adjustably seated in the inner end of said hopper, a receiving boot G, spout H, means substantially as shown for intermittently opening and closing the lower end of the latter, and the deflecting secondary spout L, for the purpose specified.

2. The combination, with a seed planter, of a transverse shaft D journaled thereon, a fertilizer hopper secured to each end of said shaft, a receiving boot G a spout H, valve 15 for opening and closing said spout, a deflector secondary spout L, and an arm connected with the secondary spout for moving it, substantially as set forth.

3. The combination, with a seed planter, the seed boxes of which are each provided with a bracket secured to the rear portion, of a shaft journaled in said brackets, a fertilizer hopper secured to each end of said shaft, a tube communicating with each of said hoppers, a spout communicating with each tube, and means for opening and closing said spouts, substantially as set forth.

In testimony whereof I affix my signature in presence of two witnesses.

GEORGE W. PACKER.

Witnesses:
A. L. KREIDER,
THOMAS A. GALT.